Nov. 16, 1954    R. W. KRONLUND    2,694,360
PEAT MOSS DEHYDRATING AND CLEANING APPARATUS
Filed Aug. 28, 1950    2 Sheets-Sheet 1

Inventor
Raymond W. Kronlund
By Eugene P. Farley
Atty.

Nov. 16, 1954  R. W. KRONLUND  2,694,360
PEAT MOSS DEHYDRATING AND CLEANING APPARATUS
Filed Aug. 28, 1950  2 Sheets-Sheet 2

Inventor
Raymond W. Kronlund
By Eugene D. Farley
Atty.

United States Patent Office 2,694,360
Patented Nov. 16, 1954

2,694,360

PEAT MOSS DEHYDRATING AND CLEANING APPARATUS

Raymond W. Kronlund, Tacoma, Wash.

Application August 28, 1950, Serial No. 181,764

5 Claims. (Cl. 100—75)

This invention relates to a method for dehydrating and cleaning peat moss (Sphagnum) and to apparatus therefor. It pertains particularly to a method and apparatus for dehydrating and cleaning peat moss so that it is in a superior form for use in its numerous applications, including nursery mulches, packing, absorbent products and the like.

For the foregoing and other applications, it is necessary that peat moss be free from foreign matter, and of relatively uniform particle size. It also should be substantially dry to avoid the cost of transporting a product having a high water content. These objectives are difficult to attain, however, since the peat moss is found in bogs in various stages of decomposition and admixed with particles of foreign organic matter as well as with large objects such as stones, roots and sticks.

In addition, the structure of the peat moss plant is such as to present a formidable obstacle to attempts to remove its water content. Only a very small proportion of the cells comprising the peat moss are living, the remainder being dead, thick-walled and filled with water. Each of the dead cells thus forms a sealed container in which the water is trapped and from which it cannot escape without rupturing the cell wall.

For this reason and also because of the compact character of the moss, many weeks of air drying are required to dry it appreciably. Furthermore, dehydrating it by the application of pressure is ineffective under ordinary conditions because of the tremendous resistance to crushing offered by the multiplicity of water filled cells comprising the mass. The direct application of pressure is entirely ineffective, and the material cannot be fed between rolls such as steel rolls having hard, rigid surfaces. If this is attempted, the peat moss first backs up behind the rolls and then, if forced therebetween, is so incompressible that it is capable of rupturing heavy bearings and snapping the substantial shafts which support the rolls. The conventional methods of dehydrating other materials therefore are not applicable to the dehydration of peat moss.

It is a general object of the present invention to provide a method and apparatus for substantially dehydrating peat moss as it is obtained from an ordinary peat moss bog.

It is another object of the present invention to provide method and apparatus for freeing peat moss from large foreign objects such as sticks, stones and roots which are present in the moss in its natural state.

Still another object of the present invention is the freeing of peat moss from small particles of organic matter which discolor it, thereby producing a product of a uniform, light brown color.

Still another object of this invention is the provision of a method and apparatus for forming a peat moss product of uniform particle size.

A further object of this invention is the provision of a method for dehydrating and cleaning peat moss which method is highly effective, but requires only relatively simple and inelaborate apparatus.

Still a further object of the present invention is the provision of a method and apparatus for dehydrating and cleaning peat moss thoroughly but rapidly, accomplishing in a few minutes that which heretofore has required long periods of time.

The manner in which the foregoing and other objects of the present invention are accomplished will be apparent from the following specification and claims considered together with the drawings wherein:

Figure 3 is an enlarged, fragmentary detail view of a pair of rollers embodied in the apparatus of Figures 1 and 2, illustrating the action thereof on a peat moss blanket or mat passing therebetween.

Generally stated, the presently described peat moss dehydrating and cleaning method comprises first disintegrating and picking apart the raw peat moss, fluffing it up and forming it into a mat or blanket. This may be accomplished, for example, by passing it between a pair of picker rolls, i. e. rolls having interengaging teeth thereon and preferably rotated at differential speeds. This also separates the individual leaves comprising the peat moss plant from each other, thereby forming particles of uniform size.

Next the disintegrated peat moss is hydraulically treated with jets of water under pressure. This washes out from the mat particles of organic matter which contaminate it and discolor it.

The disintegrated and washed mat then is stripped or wrung out in such a manner that pressure is applied at any given time to a relatively small proportion only of the multiplicity of water-filled cells comprising the mass. In this manner, the water is stripped progressively from the cells along the entire length of the blanket by the exertion of a relatively small pressure thereon. Such an action may be had, for example, by passing the mat through dehydrating rollers the peripheral surfaces of which are covered with a substantial layer of a resilient material such as soft rubber. The rollers are adjusted so that there is a substantial nip therebetween. As the mat is passed through them, they therefore are deformed, some of the resilient material being displaced in the infeed direction. However, as the rolls continue to turn, the displaced material because of its elasticity, resumes its normal position on the roll, thereby drawing the peat moss into the pressure area between the rolls and stripping or wringing the water therefrom in the manner explained above. This sequence of operations, i. e. disintegrating the peat moss, washing it and stripping the water from the peat moss cells may be repeated as often as necessary to obtain a product having the desired color and degree of dehydration.

Figure 1:
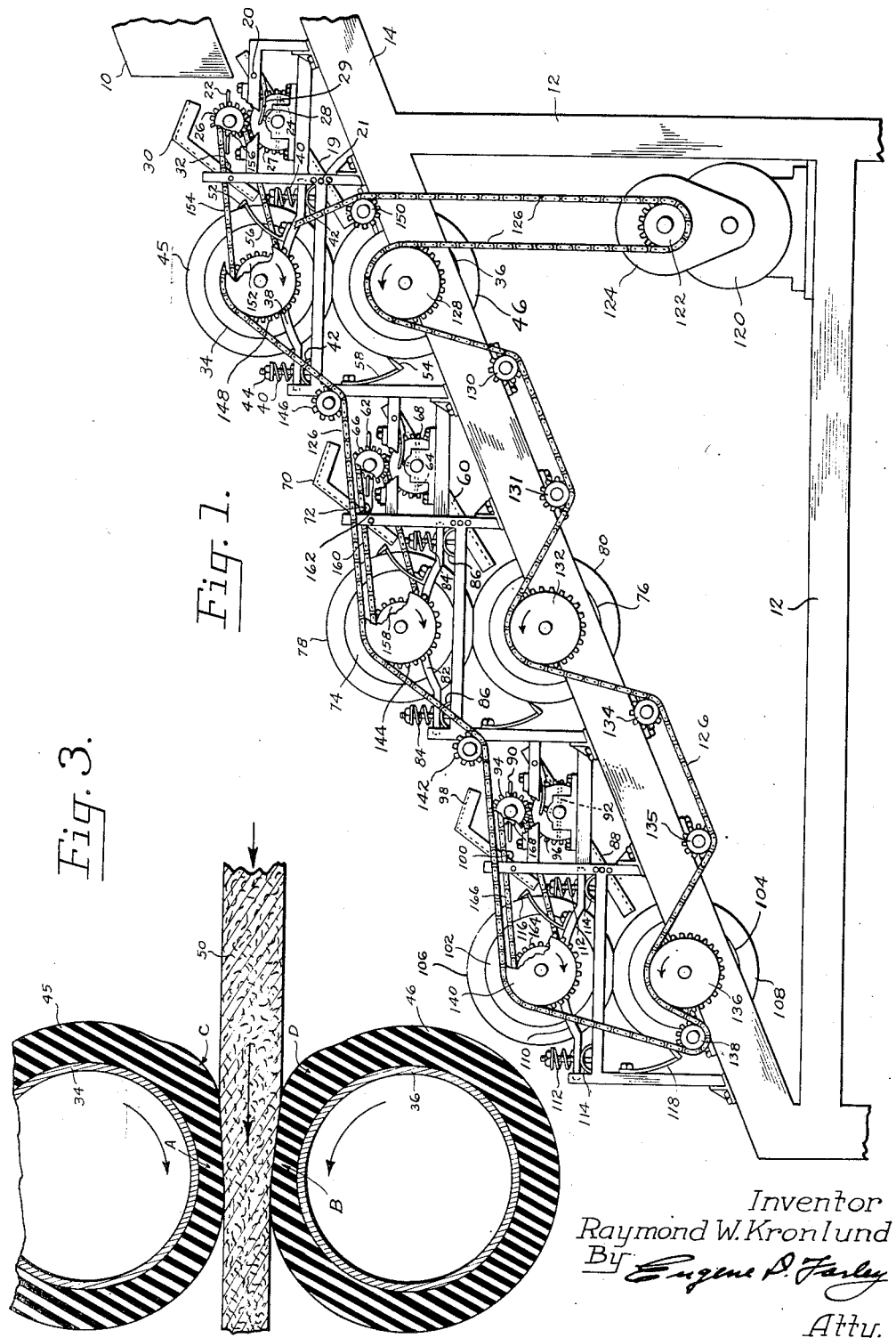
Figure 1 is a view in side elevation of apparatus for practicing the presently described method of dehydrating and cleaning peat moss.
Figure 2:
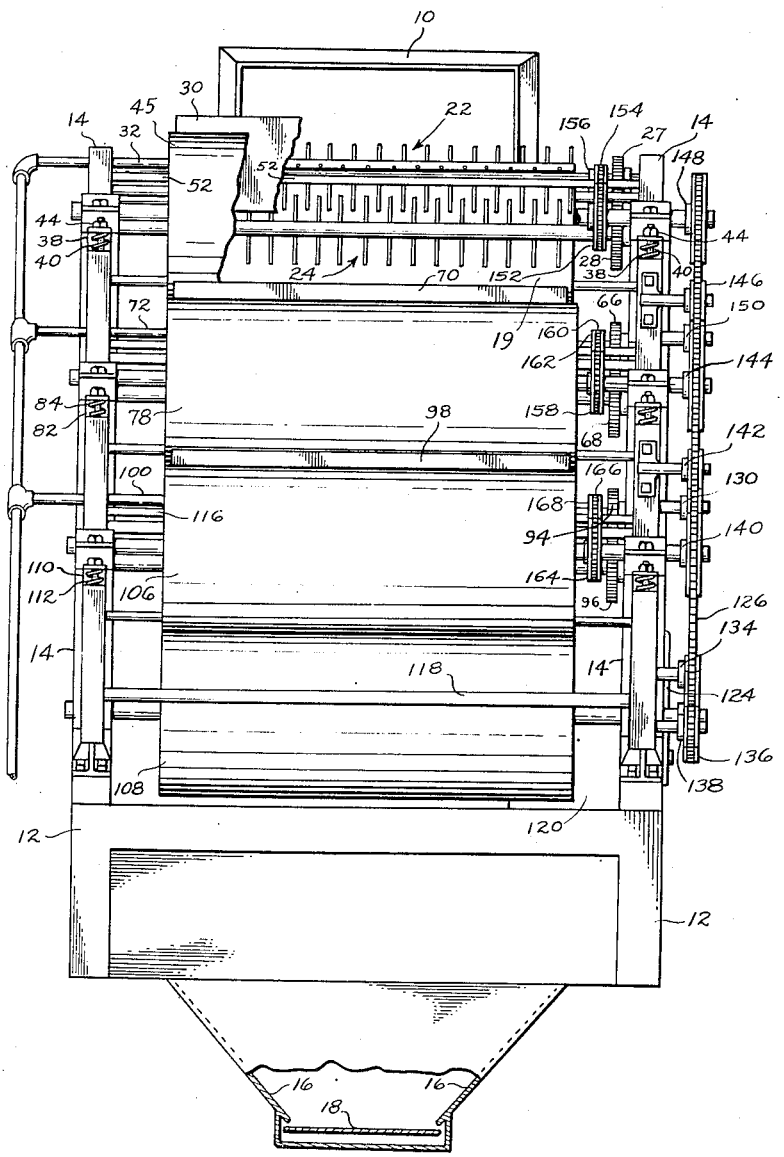
Figure 2 is a view in front elevation of the apparatus of Figure 1.

Considered in greater detail, the presently described method for cleaning and dehydrating moss may be effected in the apparatus illustrated in Figures 1 to 3. After being dredged hydraulically or otherwise from the bog, the peat moss preferably is given a preliminary washing in a tub provided with agitating means. It then is drained from the tub and passed through a sluice trough 10 into the cleaning and dehydrating apparatus.

The latter is supported on a frame indicated at 12 which carries the two parallel support members 14 sloping downwardly from the sluice trough at a predetermined angle suitable for effecting the gravitational flow of the moss through the apparatus. Beneath the frame structure is a trough 16 adapted to receive and convey away water expressed from the peat moss. This trough is provided with a conveyor 18 on which collect any solid particles for periodic or continuous removal. In this way, clogging of the trough is prevented.

From the sluice trough, the peat moss is delivered to the first unit of the cleaning and dehydrating apparatus which is supported transversely across the upper ends of support members 14. There it is deposited upon a bottom guide or chute 19 supported on suitable structural members and arranged at a downwardly inclining angle. The angle of inclination of chute 19 preferably is adjustable to permit varying the rate of gravitational flow of the moss. To this end, the chute is attached pivotally to the frame through pin 20 at one of its ends, and through pin 21 at the other of its ends, pin 21 being insertable in a selected one of a vertical series of perforations in the frame of the apparatus.

Next the moss passes between a pair of disintegrating or picker rolls 22, 24 positioned above the chute 19. These comprise spiked rolls having thereon interengaging teeth and driven respectively through gears 26, 27 of predetermined differential diameter calculated to cause rotation of the picker rolls at a differential rate. The picker roll 24 rotates counterclockwise, as viewed in Figure 1, its teeth thereby lifting the moss from the infeed side of the chute and carrying it upwardly into the path of the teeth on roll 22. As a result, the rolls 22, 24 exert a disintegrating and beating action upon the peat moss, tearing it apart and distributing it on the outfeed side of chute 19 in a uniform blanket or mat. In addition, they disintegrate the peat moss into its component leaves thereby reducing it to ultimate particles of uniform size. Still further, as they rapidly revolve, they screen out from the moss and eliminate from the apparatus large pieces of foreign matter such as stones, sticks and roots.

The rotation of the picker rolls may also be employed to vibrate chute 19, thereby promoting the flow of moss through the apparatus. Hence there may be provided a radially extending pin or dog 28 on the end of the shaft mounting picker roll 24. This engages a flexible arm 29 rigidly attached to and extending outwardly from chute 19. The resulting repeated contacts of the pin with the arm then will produce the desired vibration in the chute.

A top guide or hood 30 is positioned above the picker rolls. This is formed angularly to cover the rolls and to deflect onto chute 19 any upwardly thrown peat moss particles.

Stationed beneath hood 30 is hydraulic jet means for washing the peat moss disintegrated by the picker rolls. Such means may comprise the spray pipe 32 stationed opposite the picker rolls and directed against the peat moss as it leaves the same. The spray pipe is suitably supplied with water under substantial pressure which, when ejected against the peat moss, washes it free from particles of organic matter and other materials. These usually are of comparatively dark color. Hence their removal restores to the peat moss its native, uniform light brown appearance.

The peat moss which has been disintegrated, washed and formed into a blanket or mat then passes between a pair of dehydrating rollers 34, 36. These are rotatably mounted on the supporting structure, being journalled thereto. One of them, preferably the top roller 34, is resiliently mounted on yoke 38 which, in cooperation with springs 40 and 42, permits adjustment through nuts 44 of the tension exerted by the top roll.

As heretofore has been indicated, it is difficult if not impossible to squeeze peat moss between rollers having a hard, rigid surface. For this reason, the peripheral surfaces of the dehydrating rollers 34, 36 are each covered with a substantial layer (45, 46, respectively) of a resilient material such as soft rubber. These layers may be vulcanized or otherwise affixed to the core of the roller. Also they may be of varying but substantial thickness, for example from 1½ to 3 inches, preferably 2 inches thick where the internal diameter of the roll is about 16 inches. The hardness of the rubber preferably should be at least about 50 measured on the Pusey-Jones scale.

The dehydrating rolls 34, 36 are adjusted so that they are in peripheral pressure relationship to each other with a substantial nip, for example about 6 inches. As a result, when the peat moss mat is passed therebetween (Figure 3) a substantial distortion or bulging of the resilient coatings on the rolls occurs on the infeed side, the areas of the rubber layers immediately opposite each other being correspondingly thin.

The resulting stretching of the resilient layers is in large measure responsible for the successful application of the dehydrating rolls in expressing the water from the peat moss. This may be because as the rolls are rotated the elastic action of the rubber in sections A, B of the rolls drawing in the displaced rubber in sections C, D thereof contemporaneously draws the peat moss a little bit at a time between the rolls. As a consequence, a stripping or wringing action is exerted upon the water-filled cells comprising the peat moss mass. These cells then are ruptured and the water content expressed effectively, whereas if direct pressure were to be exerted thereupon, the cells reinforcing each other and filled with an incompressible medium would successfully withstand the pressure of the rolls.

The dehydrating rolls thus progressively express the water from the peat moss mat fed thereto, being cleaned during this process by suitable means such as the scrapers or doctor blades 52, 54. These preferably are mounted on leaf springs 56, 58, respectively, attached to the frame of the unit and pressing the blades against the surface of the roll with a desired tension.

Although the peat moss is delivered to the outfeed side of rolls 34, 36 in a substantially dehydrated and cleaned condition, for many commercial purposes it may be desirable to subject it to further treatment, as by recycling it to the above described cleaning and dehydrating unit. Preferably, however, the apparatus is built in multiple units, each of which has a construction similar to that described above. In the embodiment selected for illustration herein, there are three such units arranged progressively lower on the inclined support members 14.

Thus after leaving rolls 34, 36, the peat moss blanket is delivered into an inclined chute 60 and passed to picker rolls 62, 64 which correspond to picker rolls 22, 24 of the first unit in structure and function. The rolls 62, 64 are provided with interengaging teeth and are driven at differential rates through sprockets 66, 68, respectively. The peat moss after being torn apart and distributed by the picker rolls is deflected by hood 70 and subjected to a second washing by means of the hydraulic jet 72. It then is fed in a uniform blanket between dehydrating rolls 74, 76 having substantial peripheral coatings 78, 80 of resilient material.

The rollers 74, 76 are in peripheral pressure relationship to each other, there being a substantial nip therebetween. In addition, one of them, e. g., the top one, is mounted on a yoke 82 with associated springs 84, 86 so that the pressure exerted by the rolls may be adjusted as desired.

The peat moss delivered from the second cleaning and dehydrating unit then may be passed to a third such unit of similar construction. Thus it may be directed by means of chute 88 between picker rolls 90, 92 driven at differential rates by gears 94, 96 respectively. The disintegrated peat moss is deflected by hood 98 and washed by means of a spray from spray pipe 100. The jet 72 and spray pipe 100 are similar in arrangement to the spray pipe 32 illustrated at the top of Fig. 2. It then passes between dehydrating rolls 102, 104 covered with peripheral layers 106, 108 of soft, resilient material. The top one of these rolls is mounted on a yoke 110 and its pressure is adjustable by means of springs 112, 114 associated with the yoke. Spring mounted doctor blades 116, 118 are provided for continuously cleaning the surfaces of the dehydrating rolls.

Although the various units of the presently described peat moss cleaning and dehydrating apparatus may be driven independently, it is preferred to drive them through a single motor unit 120 mounted for example, on structural member 12. A pulley or sprocket 122 is driven by the motor through a suitable gear reduction train 124. This, in turn, drives a continuous flexible member 126 which may be a cable or a chain, preferably the latter. If the latter, it passes around sprocket 128 thereby driving roll 36, around idler sprockets 130, 131 around sprocket 132 driving roll 76, around idler sprockets 134, 135 and thence around sprocket 136 driving roll 104. Continuing in a clockwise direction, the flexible member passes around idler sprocket 138, sprocket 140 which drives roll 102, idler sprocket 142, sprocket 144 which drives roll 74, idler sprocket 146, sprocket 148 which drives roll 34, and idler sprocket 150, whereafter it again passes around sprocket 122 driven by the motor.

The picker roll assemblies may be driven from the shafts mounting the dehydrating rolls. Thus picker rolls 22, 24 are driven from dehydrating roll 34 through a sprocket 152 mounted on the shaft thereof and interconnected through chain 154 with sprocket 156 on the shaft of picker roll 22. Picker roll 24 then is driven through the interengaging gears 26, 27.

Similarly picker rolls 62, 64 are driven from the shaft of dehydrating roll 74. A sprocket 158 is mounted on the shaft of the latter and interconnected through a chain 160 with a sprocket 162 mounted on the shaft of picker roll 62. Picker roll 64 then is driven through interengaging sprockets 66, 68 in the manner above described.

Picker rolls 90, 92 are driven from dehydrating roll 102. On the shaft of the latter is mounted a sprocket 164 which is connected through chain 166 to sprocket 168 on the shaft of picker roll 90. This then drives picker roll 92 through the meshing gears 94, 96. In this manner, there is provided a synchronized drive whereby all the units of the dehydrating and cleaning apparatus are driven together from a central source of power at a controlled and predetermined rate.

*Operation*

The manner of operation of the presently described peat moss dehydrating and cleaning apparatus is as follows. Peat moss delivered from sluice trough 10 onto chute 19 is fed between the picker or agitating rolls 22, 24. This disintegrates the moss, screens out the stones, pieces of wood, etc., breaks up the peat moss into its individual leaves, and distributes it across the width of the apparatus.

After leaving the disintegrating or picker rolls, the disintegrated peat moss is sprayed by water under pressure from spray pipe 32 which washes off particles of discoloring organic matter which may be present thereon. The disintegrated and washed peat moss then passes between the dehydrating rolls 34, 36. These, having thick peripheral coverings of rubber or other resilient material, draw the peat moss progressively between the rolls, stripping or wringing from the individual water filled cells the water content thereof. The pressure exerted by the rolls may be adjusted through nuts 44 cooperating with springs 40, 42 and the surfaces of the rolls during operation are kept free from adherent peat moss by doctor blades 52, 54. The water from jets 32 as well as that expressed from the peat moss itself drops downwardly into trough 16 whence it is conveyed away, conveyor 18 serving to remove any solid particles.

The dehydrated and cleaned peat moss delivered from the outfeed side of rollers 34, 36 then may be passed through a sequence of similar units incorporating in the illustrated embodiment of the dehydrating rolls 74, 76 of the intermediate unit and the dehydrating rolls 102, 104 of the terminal unit. These progressively clean and dehydrate the peat moss so that, as an ultimate product, there is obtained peat moss having its native, light brown color and subdivided into uniform particles comprising the leaves of the sphagnum moss. In addition, the peat moss is free from sticks, roots and the like which heretofore have contaminated the commercial product. Also, it has been dehydrated until it has a water content of only about 10 to 15% of its original value, this being the optimum for baling and handling the material. As a result, the moss may be transported conveniently and inexpensively. These advantages are obtained, furthermore, by a relatively simple method which is far more rapid than the inefficient methods of the prior art and which employs relatively simple and inelaborate apparatus.

It is to be understood that the form of my invention, herewith shown and described, is to be taken as a preferred example of the same, and that various changes in the shape, size and arrangement of parts may be resorted to, without departing from the spirit of my invention or the scope of the subjoined claims.

Having thus described my invention, I claim:

1. Peat moss dehydrating apparatus comprising a pair of rotatably mounted rollers contacting each other in peripheral pressure relationship, the peripheral surface of each roller comprising a layer of rubber having a hardness of at least about 50 on the Pusey-Jones scale, guide means positioned above and below the peat moss and directed toward the infeed side of the rollers for delivering the peat moss thereto, and means for rotating the rollers, the rubber surfaces of the rollers being constructed to deform under the resistance of the peat moss to form bulges adjacent the peat moss on the infeed side of the rollers and to form cooperating stretched areas engaging the peat moss between the rollers, whereby progressively to strip the water from the cells comprising the peat moss as the latter passes between the rollers.

2. The apparatus of claim 1 wherein the rubber layer on the rollers is from about 1½ to about 3 inches thick.

3. The apparatus of claim 1 including vibrating means connected to the guide means for vibrating the same, thereby facilitating the passage of the peat moss thereover.

4. Peat moss dehydrating and cleaning apparatus comprising a frame, peat moss disintegrating means mounted on the frame adapted to fluff and distribute the peat moss while screening therefrom pieces of foreign matter, top and bottom guide means positioned for receiving the peat moss from the disintegrating means, a pair of dehydrating rollers rotatably mounted on the frame and positioned for receiving the peat moss from the guide means, and means to rotate said rollers the rollers contacting each other in peripheral pressure relationship and each roller having a surface layer of rubber having a hardness of at least about 50 on the Pusey-Jones scale, the rubber surfaces of the rollers being constructed to deform under the resistance of the peat moss and to form bulges adjacent the peat moss on the infeed side of the rollers and to form cooperating stretched areas engaging the peat moss between the rollers, whereby progressively to strip the water from the cells comprising the peat moss as the latter passes between the rollers.

5. The apparatus of claim 4 including hydraulic jet means positioned at the outfeed side of the peat moss disintegrating means for washing foreign matter from the peat moss.

References Cited in the file of this patent

UNITED STATES PATENTS

| Number | Name | Date |
| --- | --- | --- |
| 75,101 | Willoughby | Mar. 3, 1868 |
| 242,045 | Reilly | May 24, 1881 |
| 320,848 | Cathcart | June 23, 1885 |
| 346,817 | Hungerford | Aug. 3, 1886 |
| 820,074 | Spelman | May 8, 1906 |
| 1,250,666 | Rueping | Dec. 18, 1917 |
| 1,447,344 | Fisk | Mar. 6, 1923 |
| 1,476,407 | McDougall | Dec. 4, 1923 |
| 1,644,175 | Church | Oct. 4, 1927 |
| 1,947,106 | Plumstead | Feb. 13, 1934 |
| 2,061,196 | Haymers | Nov. 17, 1936 |
| 2,439,014 | Luhrmann | Apr. 6, 1948 |
| 2,453,818 | Smith | Nov. 16, 1948 |

FOREIGN PATENTS

| Number | Country | Date |
| --- | --- | --- |
| 3,378 | Great Britain | 1889 |
| 35,846 | Norway | Oct. 9, 1922 |
| 64,540 | Austria | Apr. 25, 1914 |
| 450,216 | Great Britain | July 8, 1936 |
| 532,572 | France | Nov. 17, 1921 |